United States Patent [19]

Swersky

[11] Patent Number: 5,791,725
[45] Date of Patent: Aug. 11, 1998

[54] WIND BAFFLE

[76] Inventor: Robert B. Swersky, 9 Lake Rd., Lake Succose, N.Y. 11020

[21] Appl. No.: 807,018

[22] Filed: Feb. 26, 1997

[51] Int. Cl.$^6$ ............................................... B62D 35/00
[52] U.S. Cl. ............................................. 296/180.1; 296/85
[58] Field of Search ............................ 296/180.1, 85; 211/105.6, 105.5

[56] References Cited

U.S. PATENT DOCUMENTS

| | | | |
|---|---|---|---|
| 4,850,637 | 7/1989 | Carlino | 296/180.1 |
| 5,024,481 | 6/1991 | Swersky | 296/180.1 |
| 5,104,269 | 4/1992 | Hardison | 211/105.6 |
| 5,195,799 | 3/1993 | Götz et al. | 296/85 |

FOREIGN PATENT DOCUMENTS 191752  8/1923  United Kingdom ............... 296/85

*Primary Examiner*—Gary C. Hoge
*Attorney, Agent, or Firm*—Steinberg & Raskin, P.C.

[57] ABSTRACT

A wind baffle for convertible automobiles including a baffle sheet, first means for affixing the baffle sheet to a pair of opposed regions in the interior of the automobile such that the baffle sheet can be held in place behind the front seat compartment of the convertible automobile to prevent wind currents from passing from the rear of the convertible automobile to the front seat compartment, the opposed regions situated on an axis, and second means for adjustably affixing the baffle sheet to a third region in the automobile interior situated outside of the axis for preventing movement of the baffle sheet about the axis.

7 Claims, 3 Drawing Sheets

WIND BAFFLE

FIELD OF THE INVENTION

The present invention relates generally to wind baffles, and more particularly, to wind baffles for convertible automobiles.

BACKGROUND OF THE INVENTION

The present invention relates to a wind baffle which is adapted to be removably installed behind the front seat of a convertible automobile, which is adjustable for different automobile widths and heights and which remains stable when the automobile is in motion.

A problem which has existed since the introduction of convertible automobiles has been that, as the automobile moves in a forward motion, air flows over the windshield and heads of the occupants of the front seat area, thus producing a lower air pressure zone in the front seat area. Consequently, reverse air currents travel between the front seats and head rests producing turbulence. These reverse air currents can have a number of negative effects on the occupants' driving experience. For example, the hair styles of the occupants are disturbed; the occupants experience difficulty in carrying on a normal conversation; the occupants are chilled on cool days; and the occupants' belongings are blown around the front seat area and possibly from the front seat compartment of the automobile.

Various attempts have been made to solve the aforementioned problems. For example, it has been suggested to provide a sheet of rigid, transparent material behind the front seat compartment via an adjustable horizontal rod having ends attachable to the respective inner side body surfaces of the automobile in order to prevent wind currents from passing from the rear of the automobile into the front seat compartment.

OBJECTS AND SUMMARY OF THE INVENTION

The device described above, however, has several disadvantages. For example, as the reverse air currents contact the rigid sheet, the sheet is caused to rotate around the horizontal rod attached thereto. As such, the upper portion of the sheet becomes pressed against the head rests of the front seats. Another disadvantage is that the sheet must be custom-made to fit a specific car. That is, the sheet must to be cut so that the top of the sheet reaches a desired point.

It is therefore an object of the present invention to provide a wind baffle which prevents wind currents from passing from the rear of a convertible automobile between the front seats and headrests into the front seat compartment wherein the height of the wind baffle is adjustable and wherein the wind baffle is prevented from pivoting around the horizontal rod assembly attached thereto.

This and other objects of the present invention which will become apparent from the following description are achieved by the wind baffle of the present invention which comprises a baffle sheet, first means for affixing the baffle sheet to a pair of opposed regions in the interior of the automobile such that the baffle sheet is situated in place behind the front seat compartment to prevent wind currents from passing from the rear of the convertible automobile between the front seats and head rests to the front seat compartment, and second means for adjustably affixing the baffle sheet to a third region in the automobile interior for preventing movement of the baffle sheet about the axis on which the opposed regions are situated.

In a preferred embodiment of the invention, the first affixing means is a substantially horizontal rod assembly affixed to one side of the baffle sheet having its ends attachable to respective inner side body surfaces of the automobile and the second affixing means is a substantially vertical rod assembly affixed to the other side of the baffle sheet having one end affixed to the baffle sheet and the other end attachable to either the floor or the rear seat of the automobile.

In another preferred embodiment of the invention, both the horizontal and vertical rod assemblies are adjustable so as to allow the wind baffle to be used with different widths and heights of automobiles. Each is formed of a tube and an extension tube slidably insertable into the tube.

Means for locking the extension tube at a desired position in the tube, preferably an aluminum or Delrin® lock nut, are also included. The adjustable horizontal and vertical rod assemblies further include spring tensioning means for applying an outward pressure to the side body surfaces of the automobile and the floor or rear seat of the automobile respectively.

In another preferred embodiment of the invention, the horizontal and vertical rod assemblies are affixed to the baffle sheet via respective acrylic tubes. The tube and extension tube arrangements are both slidably inserted into the acrylic tubes and the acrylic tubes are each bonded to opposite sides of the baffle sheet.

As an optional feature of the invention, the wind baffle can comprise a leash having a first end affixed to the wind baffle and a second end affixed to the automobile. The leash provides a safety feature to the wind baffle in the event that the wind baffle becomes detached from the automobile while in motion.

BRIEF DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE INVENTION

Figure 1:
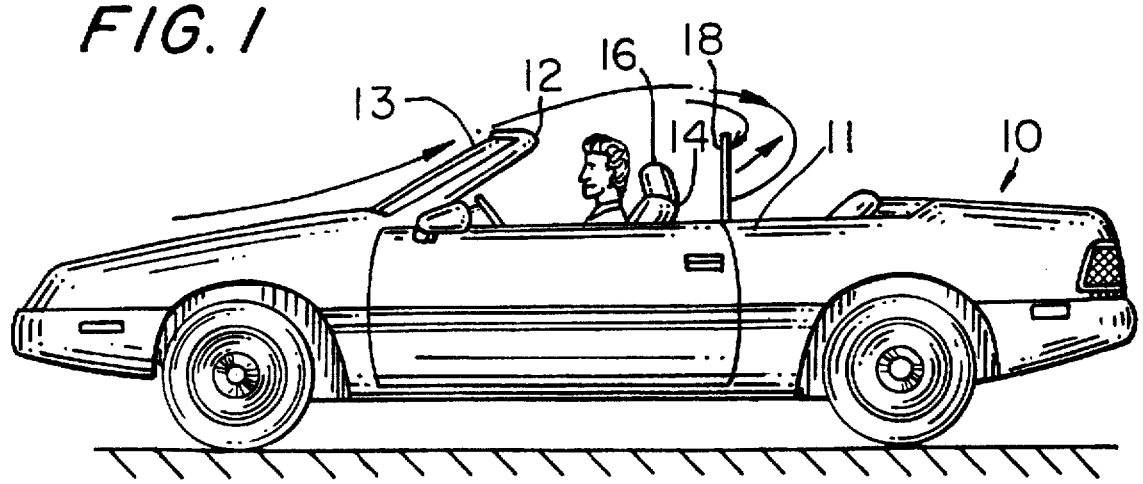
FIG. 1 is a side elevational view of a convertible automobile having a wind baffle in accordance with the present invention mounted therein.

Referring to the drawings, wherein like reference characters designate identical or corresponding parts throughout the various views, FIG. 1 shows a convertible automobile generally designated 10 having opposite side wall portions 11 extending from the front to the rear of the automobile. The automobile also has a windshield assembly 12 comprising a windshield 13 over which, when the automobile is moving in a forward direction, wind currents are deflected and caused to flow over the front seat passenger compartment, thus creating a lower air pressure zone therein.

Figure 2:
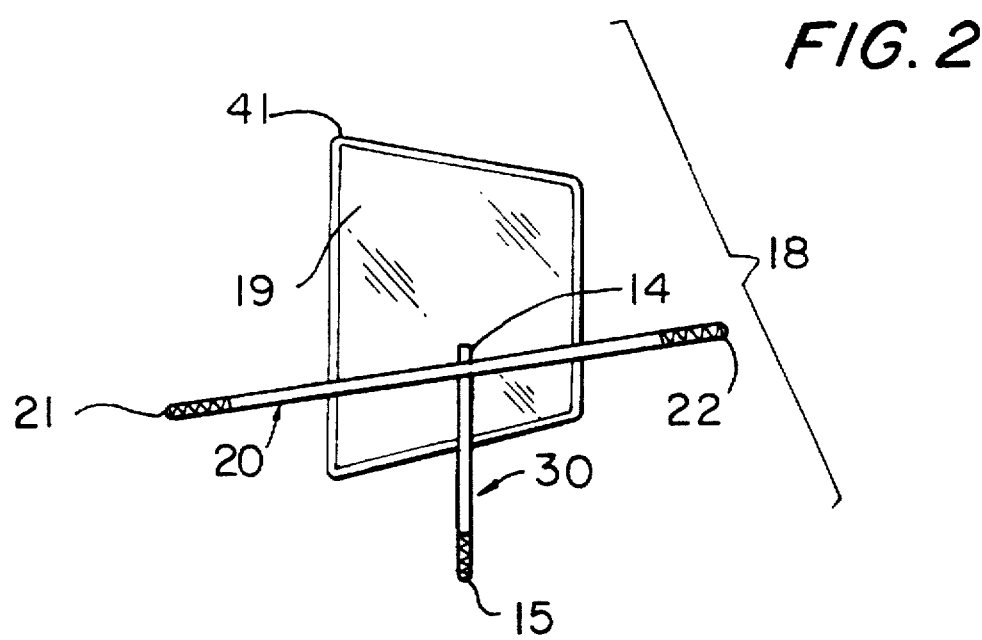
FIG. 2 is a perspective view of the wind baffle shown in FIG. 1.
Figure 3:
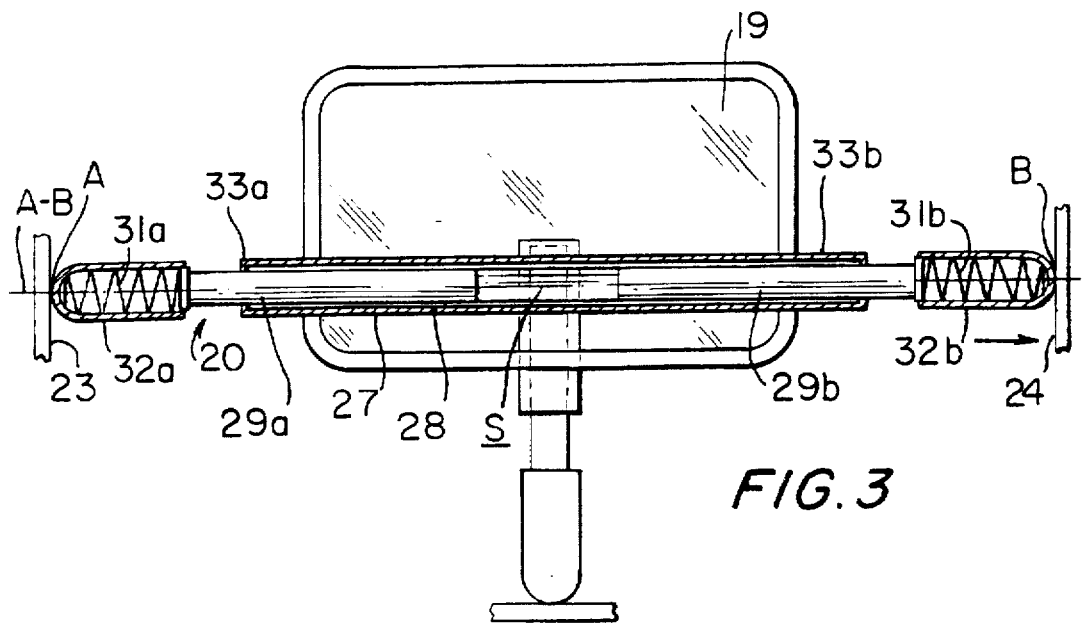
FIG. 3 is a front view in partial section of the wind baffle shown in FIG. 1.
Figure 4:
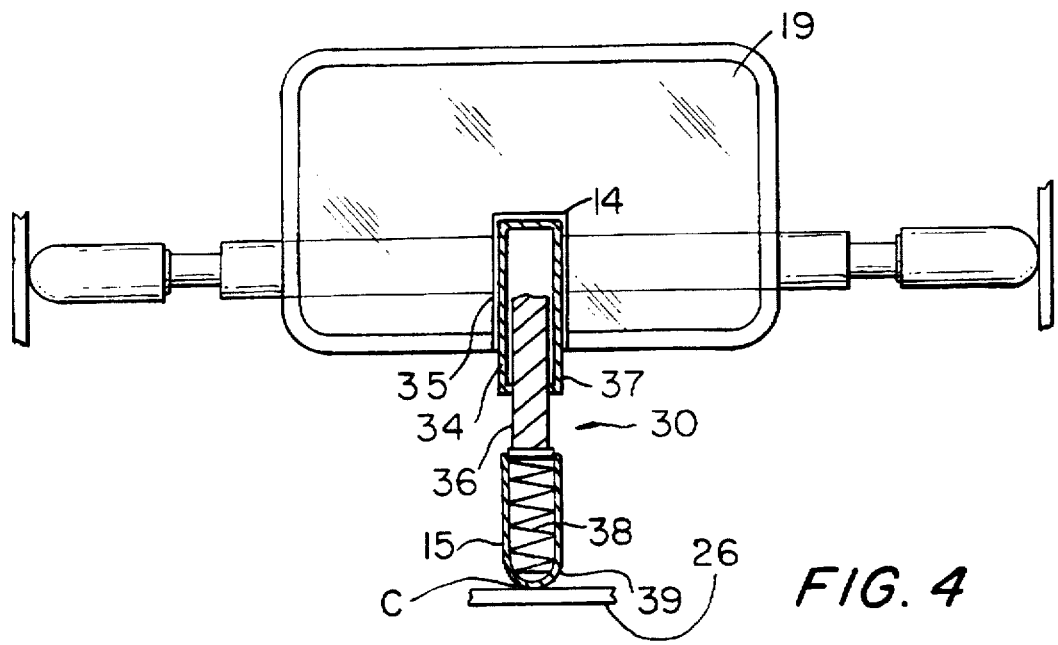
FIG. 4 is a rear view in partial section of the wind baffle shown in FIG. 1.

As shown in FIGS. 2–5, the wind baffle 18 comprises an acrylic baffle sheet 19. On one side surface of baffle sheet 19, an adjustable, substantially horizontal, rod assembly 20 is affixed having ends 21, 22 which project beyond the side edges of baffle sheet 19 and which are respectively attachable to opposed side regions A and B of the inner sides 23, 24 of the side body parts 11, 25. As shown in FIG. 4, an adjustable, substantially vertical, rod assembly 30 is affixed to the other side surface of baffle sheet 19 having a lower end 15 that projects beyond the lower edge of baffle sheet 19 and is adapted to bear against a third region C either on the rear seat or floor 26 of the automobile. If desired, horizontal rod assembly 20 and vertical rod assembly 30 can be affixed to the same side surface of baffle sheet 19. As shown in FIG. 1, the wind baffle 18 prevents reverse air currents from traveling from the rear of the car between the front seats and the head rests, thus preventing turbulence within the front seat area.

Figure 5:
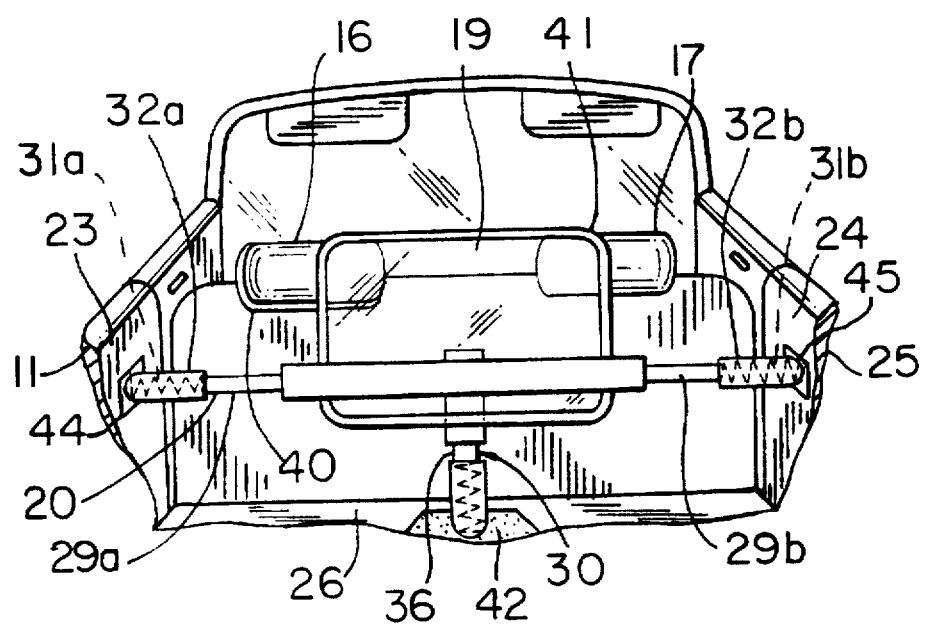
FIG. 5 is a rear view showing the wind baffle of FIG. 1 in a mounted position.

In a preferred embodiment of the invention, the width of baffle sheet 19 is made such that it extends between the approximate centers of the respective front seat headrests 16 and 17 (FIG. 5). Such an arrangement yields the advantageous features of making it convenient for a person in the front seat to place items such as packages on a shelf or seat in the rear compartment and enables sound originating in the rear compartment, e.g. from a stereophonic speaker, to be easily heard in the front seat compartment. Using a wider sheet would diminish or eliminate these advantages while the use of a narrower sheet leads to a greater, perhaps unacceptable, level of turbulence in the front seat compartment. As such, baffle sheet 19 is formed to have a width of about 20 inches to about 40 inches, preferably 30 inches, and a height of about 10 inches to about 30 inches, preferably 20 inches.

As shown in FIG. 3, the horizontal rod assembly 20 is affixed to baffle sheet 19 at a lower portion thereof. Horizontal rod assembly 20 is connected to baffle sheet 19 by means of a clear acrylic tube 27 bonded, such as by glue, to baffle sheet 19. While tube 27 and baffle sheet 19 are preferably formed of clear acrylic, each can be formed of various other materials. For example, baffle sheet 19 can be formed of plexiglass or a mesh material and tube 27 can be formed of rubber.

Horizontal rod assembly 20 is a telescoping, spring-biased rod assembly formed of an aluminum tube 28 and two aluminum extension tubes 29a, 29b, slidably inserted into both ends of tube 28. Extension tubes 29a, 29b are arranged so that they can be adjusted to fit automobiles of differing widths. That is, both ends of tube 28 comprise locking means 33a, 33b which allow extension tubes 29a, 29b to be locked at a desired position within tube 28. Locking means 33a, 33b are aluminum or Delrin® lock nuts cooperating with suitable threads provided on tube 28. However, the locking means can be any other locking device known in the art of adjustable telescoping rods.

In the illustrated preferred embodiment of the invention, horizontal rod assembly 20 further includes spring tensioning means for urging end cap members 32a, 32b against the opposed side regions A, B of respective inner side body surfaces 23, 24 of the automobile. As shown in FIG. 3, the spring tensioning means comprise springs 31a, 31b which are respectively secured to the ends of extension tubes 29a, 29b. Cap members 32a, 32b are mounted over each spring respectively and are adapted to slide over respective extension tubes 29a, 29b. With such an arrangement, horizontal rod assembly 20 provides an outward pressure to the inner side body surfaces 23, 24 of the automobile at opposed side regions A, B, respectively, thereby securing baffle sheet 19 in place.

While the spring tensioning means are preferably arranged as set forth above, the desired outward pressure can be achieved by other means. For example, one spring member can be mounted within tube 28 between the inner ends of extension tubes 29a, 29b(designated as space S). With such an arrangement, locking means 33a, 33b would be eliminated.

Referring to FIG. 4, vertical rod assembly 30 is also a telescoping, spring-biased rod assembly. As stated earlier, vertical rod assembly 30 is attached to sheet 19 and has a free end 15 adapted to bear against either the rear seat or the floor of the automobile 26 so that baffle sheet 19 is prevented from rotating about axis A–B on which opposed regions A, B are situated (i.e., baffle sheet 19 is prevented from rotating about horizontal rod assembly 20) as the wind current hits baffle sheet 19. Similar to horizontal rod assembly 20, vertical rod assembly 30 is formed of an aluminum tube 34 secured within acrylic tube 35, and an aluminum extension tube 36, slidably inserted into tube 34. Extension tube 36 is arranged so that the wind baffle can be adjusted to fit automobiles of differing heights. Also similar to horizontal rod assembly 20, one end of tube 34 comprises locking means 37 which allows extension tube 36 to be locked at a desired position within tube 34. Locking means 37 is also preferably an aluminum or Delrin® lock nut.

In a preferred embodiment of the invention, vertical rod assembly 30 also includes spring tensioning means for applying an outward pressure upon the floor or rear seat of the automobile. As shown in FIG. 4, spring 38 is secured to the end of extension tube 36 and cap member 39 is slidably mounted over both spring 38 and the end of extension tube 36.

In accordance with another feature of the invention, the wind baffle includes a leash 40 (FIG. 5) which couples baffle sheet 19 to the automobile via one of headrests 16, 17. As stated earlier, the leash provides a safety feature to the wind baffle in the event that the wind baffle becomes detached from the automobile while in motion.

In accordance with another feature of the invention, an edge-protector 41 is provided on the perimeter of baffle sheet 19 for preventing damage to the baffle sheet (FIGS. 2–4). In addition, edge-protector 41 shields the user from injury while handling the wind baffle. Edge-protector 41 is preferably formed of vinyl or metal. However, other materials can be used such as rubber.

The wind baffle assembled to the convertible automobile is shown in FIG.5. As shown, baffle sheet 19 is positioned so that it extends between the approximate centers of the respective front seat headrests 16, 17 and its top is approximately level with the top of the headrests. Baffle sheet 19 should be positioned so that it is behind and within approximately 8 inches of the headrests.

Once baffle sheet 19 is positioned in the desired location, extension tubes 29a, 29bare extended and locked an approximate equal distance so that the tips thereof contact the inner side panels of the automobile 23, 24 respectively. More specifically, extension tubes 29a, 29bare adjusted so that their tips extend slightly beyond inner side panels 23, 24 and cap members 32a, 32b are pushed inwardly to compress springs 31a, 31b. As such, the mild spring tension will hold the wind baffle in place while the additional adjustments are made.

Foam rubber leg-support 42 is situated on either the rear seat cushion or on the floor panel of the automobile and extension tube 36 of vertical rod assembly 30 is adjusted and locked in place so that its tip rests on leg-support 42 with a moderate tension. Leg-support 42 can be eliminated, if desired, and vertical rod assembly 30 can rest directly on the rear seat or floor panel of the automobile.

In another embodiment of the invention, sockets 44, 45 can be affixed to inner side panels 23, 24 in which cap members 32a, 32b of horizontal rod assembly 20 can rest. Sockets 44, 45 are preferably secured to inner side panels 23, 24 using Velcro® which can be attached to both sockets 44, 45 and inner side panels 23, 24.

Obviously, numerous modifications and variations of the present invention are possible in light of the teachings hereof Therefore, it is to be understood that the invention can be varied from the detailed description above within the scope of the claims appended hereto.

We claim:

1. A wind baffle for convertible automobiles, comprising:

a baffle sheet;

first means for affixing said baffle sheet to a pair of opposed regions in the interior of the automobile such that said baffle sheet can be held in place behind the front seat compartment of said convertible automobile to prevent wind currents from passing from the rear of said convertible automobile to the front seat compartment, said opposed regions situated on an axis; and wherein said first affixing means comprise a substantially horizontal rod assembly having ends attachable to respective inner side body surfaces of said convertible automobile;

second means for adjustably affixing said baffle sheet to a third region in the automobile interior situated outside of said axis for preventing movement of said baffle sheet about said axis; and means for coupling said horizontal rod assembly to a first side of said wind baffle wherein said coupling means comprise an acrylic tube situated around said rod assembly.

2. A wind baffle for convertible automobiles, comprising:

a baffle sheet;

first means for affixing said baffle sheet to a pair of opposed regions in the interior of the automobile such that said baffle sheet can be held in place behind the front seat compartment of said convertible automobile to prevent wind currents from passing from the rear of said convertible automobile to the front seat compartment, said opposed regions situated on an axis; and second means for adjustably affixing said baffle sheet to a third region in the automobile interior situated outside of said axis for preventing movement of said baffle sheet about said axis, said second affixing means comprising a substantially vertical rod assembly having a first end affixed to said baffle sheet and a second end attachable to either the floor or the rear seat of said convertible automobile.

3. The wind baffle of claim 2, wherein said vertical rod assembly comprises:

a tube having a first end affixed to said baffle sheet and a second free end;

an extension tube having a first end which is slidably insertable into said second free end of said tube and a second end which extends from said second free end of said tube; and means for locking said extension tube at a desired position in said tube.

4. The wind baffle of claim 3, further comprising means for coupling said vertical rod assembly to a second side of said baffle sheet.

5. The wind baffle of claim 3, wherein said vertical rod assembly further comprises spring tensioning means for applying an outward pressure to either the floor or the rear seat of said convertible automobile.

6. The wind baffle of claim 5, wherein said spring tensioning means further comprise a cap member adapted to be slidably mounted on said second end of said extension tube.

7. The wind baffle of claim 3, wherein said locking means comprise a lock nut.

* * * * *